United States Patent [19]

Maruyama et al.

[11] Patent Number: 4,537,444
[45] Date of Patent: Aug. 27, 1985

[54] OCCUPANT'S SIDE HOLDING DEVICE FOR THE SEAT BACK OF A SEAT

[75] Inventors: Katsuaki Maruyama; Yaichi Oishi, both of Toyota; Norio Noda, Okazaki; Takami Terada; Motoi Hyodo, both of Toyota, all of Japan

[73] Assignees: Toyota Jidosha Kogyo Kabushiki Kaisha; Aisin Seiki Kabushiki Kaisha, both of Aichi, Japan

[21] Appl. No.: 391,712

[22] Filed: Jun. 24, 1982

[30] Foreign Application Priority Data

Jun. 25, 1981 [JP] Japan .................... 56-94162[U]

[51] Int. Cl.³ ................................................ A47C 7/46
[52] U.S. Cl. ....................................... 297/284; 297/460
[58] Field of Search ......................... 297/284, 486, 460

[56] References Cited

U.S. PATENT DOCUMENTS

| 2,619,157 | 11/1952 | Guyton et al. ............... 297/284 |
| 3,608,960 | 9/1971 | Sherman ..................... 297/460 X |
| 3,773,382 | 11/1973 | Coursault et al. ............. 297/284 |
| 3,880,463 | 4/1975 | Shephard et al. ............. 297/284 |
| 4,019,777 | 4/1977 | Hayashi ..................... 297/284 |
| 4,370,000 | 1/1983 | Kazaoka et al. .............. 297/284 |

FOREIGN PATENT DOCUMENTS

| 140021 | 1/1978 | Fed. Rep. of Germany ...... 297/284 |
| 2721539 | 11/1978 | Fed. Rep. of Germany ...... 297/284 |
| 2740268 | 3/1979 | Fed. Rep. of Germany ...... 297/284 |
| 1272929 | 5/1972 | United Kingdom ............. 297/284 |
| 1365348 | 9/1974 | United Kingdom ............. 297/284 |
| 2056850 | 3/1981 | United Kingdom ............. 297/284 |

Primary Examiner—William E. Lyddane
Assistant Examiner—Thomas A. Rendos
Attorney, Agent, or Firm—Parkhurst & Oliff

[57] ABSTRACT

An occupant's side holding device for the seat back of an automotive seat in which occupant's body side holders are rockably provided in the lateral direction of the seat back at both the right and left side of the seat back comprising operating shafts vertically provided at both the right side and left side, a threaded shaft rotatably journaled to the seat back frame and an interlocking rod being connected between the operating shafts for symmetrically operating the shafts. A rockable arm is further secured to one operating shaft and is integrally formed with the operating shaft to be rocked in the lateral direction of the seat back upon rotation of the threaded shaft by a handle operated by the occupant. Thus, the interval between the occupant's side holders can be variably adjusted in response to the occupant's favorite side holding state of the seat by turning the handle.

6 Claims, 4 Drawing Figures

OCCUPANT'S SIDE HOLDING DEVICE FOR THE SEAT BACK OF A SEAT

BACKGROUND OF THE INVENTION

This invention relates to an occupant's side holding device for the seat back of a seat and, more particularly, to an improvement in an occupant's side holding structure or side holder having occupant's side supports formed at both the right and left side of the seat back of a seat.

In prior seats of this type, occupant's side holders are formed at both the right and left sides of the seat back of the seat to control the interval therebetween. However, such conventional seats have heretofore incorporated a relatively large number of components and parts, e.g., links, operating rods, interlocking pins, etc. Besides being difficult to assemble, the couplers of these prior seats frequently become loose making the fine adjustment of the components difficult if not impossible.

SUMMARY OF THE INVENTION

Therefore, a primary object of this invention is to provide an occupant's side holding device for the seat back of a seat which can readily and finely vary the interval between occupant's side holders in response to the occupant's favorite side holding state merely by turning a handle while sitting on the seat.

Another object of this invention is to provide an occupant's side holding device for the seat back of a seat which can be simplified in its mechanism with a lesser number of components and parts by controlling or adjusting the interval of the occupant's side holders by merely operating a handle attached to a threaded shaft having a threaded part engaged with a nut together with an operating shaft and a rockable arm.

Another object of this invention is to provide an occupant's side holding device for the seat back of a seat which can operate smoothly without causing looseness at the links, operating shaft and connecting pin of the side holding device for a long period of time.

BRIEF DESCRIPTION OF THE DRAWINGS

The above and other related objects and features of the invention will be apparent from a reading of the following description of the disclosure found in the accompanying drawings and novelty thereof pointed out in the appended claims.

DESCRIPTION OF THE PREFERRED EMBODIMENTS

The present invention will now be described in more detail with respect to the accompanying drawings.

Figure 1:
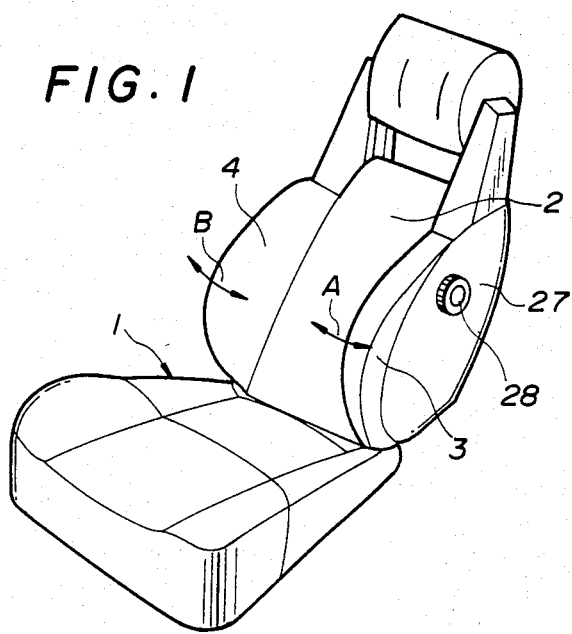
FIG. 1 is a perspective view of a seat in one preferred embodiment of the present invention

In FIG. 1, occupant's side holders 3 and 4 are provided as occupant's body side supports at both the right side and left side of seat back 2 of seat 1. Side holders 3 and 4 are constructed to be rockable in the directions designated by arrows A and B. By adjusting the interval between holders 3 and 4. The occupant's favorite side holding state can be obtained.

Figure 2:
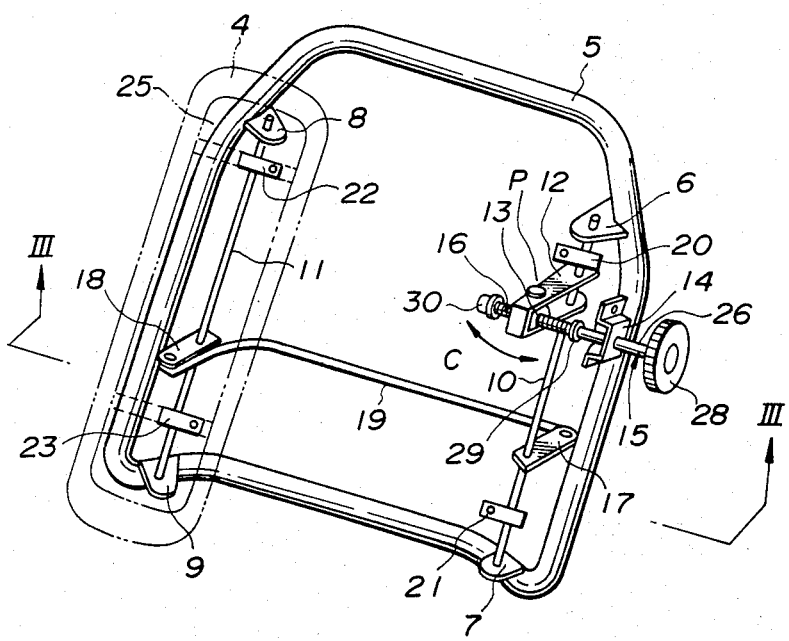
FIG. 2 is a perspective view showing the essential structure of one embodiment of this invention.
Figure 3:
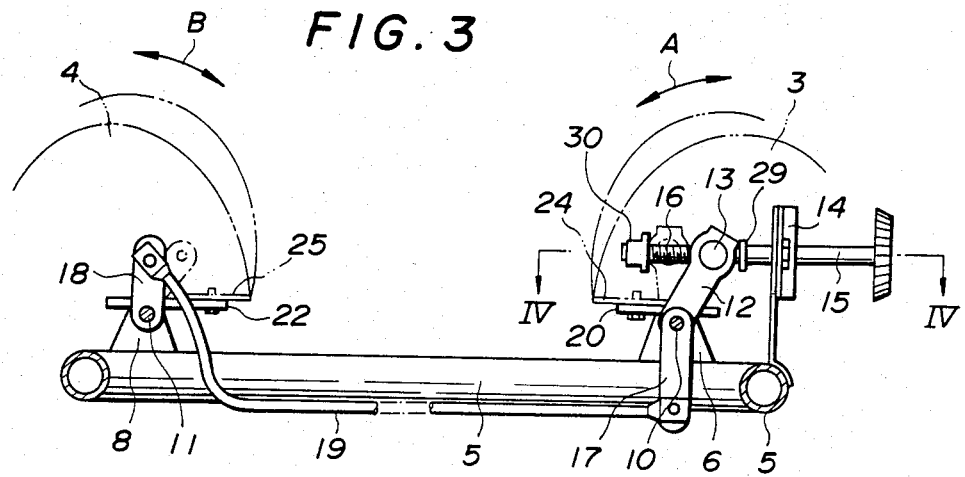
FIG. 3 is a sectional view of the structure taken along line III—III of FIG. 2.
Figure 4:
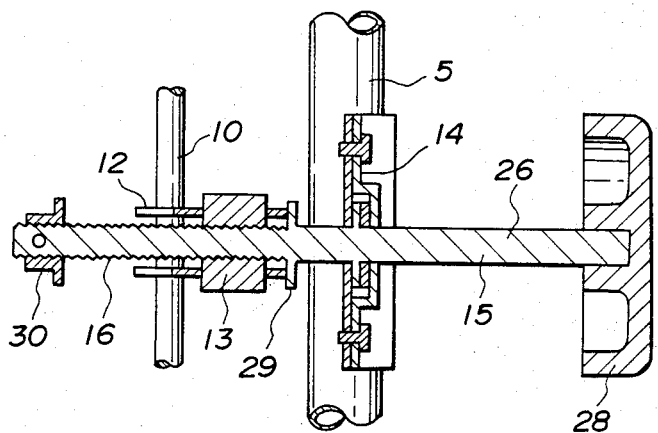
FIG. 4 is a sectional view of the structure taken along the line IV—IV in FIG. 3.

FIGS. 2 through 4 show a mechanism for rockably moving the occupant's side holders 3 and 4 in the directions designated by arrows A and B as described above. Operating shafts 10 and 11 are vertically rotatable around their own axes via upper and lower right and left side brackets 6, 7 and 8, 9 located at both the right and left side of seat back frame 5. As shown in the embodiment of FIG. 2, seat back frame 5 is of substantially rectangular shape. The operating shafts 10 and 11 are constructed to slightly deflect in the longitudinal direction of a vehicle in which this seat is installed. A rockable arm 12 is secured at one end to the one operating shaft 10 and has at its other end a nut 13 secured by pin P.

Horizontally journaled to the seat back frame 5 and rotatably around its own axis is shaft 15 which is via bracket 14 integrally secured to frame 5. As can be seen in FIG. 2, shaft 15 extends in the lateral direction of seat back 2 and hence in a direction perpendicular to operating shaft 10. In this embodiment the operating shaft 10 is constructed to move slightly longitudinally of the vehicle with the support of bracket 14 as a fulcrum. The threaded part 16 of shaft 15 is engaged with the threaded hole of the nut 13. In this manner, when shaft 15 is normally or reversely rotated or turned, nut 13 will move axially forwardly or reversely of shaft 15. When nut 13 is thus moved, the rockable arm 12 will rockably move in the direction of arrow C as shown in FIG. 2. When arm 12 rockably moves, operating shaft 10 will rotate normally or reversely in the lateral direction of the seat back 2 of the seat as shown by arrow C.

Links 17 and 18 are fixedly secured at one end to operating shafts 10 and 11 respectively. Links 17 and 18 are cooperatively connected by an interlocking rod 19 which is arranged between links 17 and 18 and is pivotally secured at both ends thereof. Accordingly, the normal and reverse rotations of the direction designated by arrow C of operating shaft 10 are transmitted to operating shaft 11 as the reverse and normal rotations of the symmetrical direction thereto.

It is noted that, since links 17 and 18 are equally formed in size, the rotating angles of both operating shafts 10 and 11 become equal to one another.

Fitting members 20, 21 and 22, 23 of shafts 10 and 11 respectively, are secured to operating shafts 10 and 11 at the upper and lower portions through welding or the like, and are respectively fixedly secured to frames 24 and 25 of the right and left occupant's side holders 3 and 4. When the operating shafts 10 and 11 are rotated normally or reversely in the direction designated by arrow C in this manner, the occupant's side holders 3 and 4 are accordingly rockably moved in the direction designated by arrows A and B respectively.

Located outside of section 27 of seat back 2 is shaft end 26 of shaft 15 on which handle 28 is attached.

Stoppers 29 and 30 are attached to both ends of threaded part 16 of shaft 15 to limit the moving range of nut 13 as shown in FIGS. 2 through 4.

It can be appreciated from the foregoing description that since the occupant's side holding device for the seat back of the seat is constructed to vary an interval between the occupant's side holders 3 and 4 in response to the rotation of handle 28 by the occupant sitting on the seat, the occupant can readily obtain his favorite body side holding state.

It is further understood that since the occupant's side holding device for the seat back of the seat according to this invention is constructed to vary the interval between the occupant's side holders 3 and 4 by merely a threaded shaft having a threaded part engaged with a nut together with the operating shafts and the rockable arms, it can simplify the mechanism with less number of components and parts.

Inasmuch as the occupant's side holding device of the seat back of the seat of the invention is constructed to have a mechanism for spirally moving the threaded shaft with the nut and rotating the operating shafts without a transmitting section capable of producing looseness, e.g., links, operating rods, connecting pins, etc., it can provide smooth and effective operation without looseness for long period of time.

It is to be understood that other embodiments will occur to those skilled in the art and that these modifications are to be construed as part of the present invention.

What is claimed is:

1. An occupant's side holding device for a seat back of a seat in which occupant's body side holders are rockable in a lateral direction of the seat back at both a right side and a left side of the seat back, said device comprising: a frame on each one of said occupant's side holders;

vertical operating shafts rotatable around their own axes at both a right side and a left side of a seat back frame;

a rockable arm secured to one of said operating shafts;

a nut pivotally secured to said rockable arm;

a threaded shaft rotatably journaled to the seat back frame and extending toward the lateral inside of the seat back;

the threaded part of said threaded shaft being engaged with the threaded hole of said nut;

said rockable arm and said operating shafts being integrally formed and being rocked in the lateral direction of said seat back upon rotation of said threaded shaft;

an interlocking member arranged between said operating shafts for rotating the other operating shaft symmetrically with respect to said one operating shaft;

fitting members integrally secured to said operating shafts for securing both said operating shafts to suitable positions on the frames of said occupant's side holders; and a handle provided at an outside end of said threaded shaft.

2. The occupant's side holding device according to claim 1, further comprising one link fixedly secured at one end to said one operating shaft and another link fixedly secured at one end to said other operating shaft to extend in the symmetrical direction of said one link whereby said links are cooperatively connected by said interlocking member and said links are equally formed in size.

3. The occupant's side holding device according to claim 1, further comprising stoppers attached to both sides of said threaded shaft for limiting the moving range of said nut on said threaded shaft.

4. The occupant's side holding device according to claim 1, wherein said interlocking member is a rod.

5. The occupant's side holding device according to claim 1, wherein said vertical operating shafts are rotatably secured in brackets located on said right side and said left side of said seat frame.

6. The occupant's side holding device according to claim 1, wherein said nut is secured to said rockable arm by a pin.

* * * * *